US012615657B2

(12) United States Patent
Jiang

(10) Patent No.: US 12,615,657 B2
(45) Date of Patent: Apr. 28, 2026

(54) COMMUNICATION PROCESSING METHOD AND DEVICE, AND COMPUTER STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 536 days.

(21) Appl. No.: 17/904,644

(22) PCT Filed: Feb. 21, 2020

(86) PCT No.: PCT/CN2020/076255
§ 371 (c)(1),
(2) Date: Aug. 19, 2022

(87) PCT Pub. No.: WO2021/164020
PCT Pub. Date: Aug. 26, 2021

(65) Prior Publication Data
US 2023/0095046 A1 Mar. 30, 2023

(51) Int. Cl.
*H04W 72/541* (2023.01)
*H04W 72/40* (2023.01)

(52) U.S. Cl.
CPC ......... *H04W 72/541* (2023.01); *H04W 72/40* (2023.01)

(58) Field of Classification Search
CPC ..... H04W 72/50; H04W 72/51; H04W 72/54; H04W 72/541; H04W 72/40;
(Continued)

(56) References Cited

U.S. PATENT DOCUMENTS

2012/0020231 A1* 1/2012 Chen ................... H04W 36/302
370/252
2012/0069766 A1* 3/2012 Fu .......................... H04B 15/00
370/332
(Continued)

FOREIGN PATENT DOCUMENTS

CN 102378369 A 3/2012
CN 103281788 A 9/2013
(Continued)

OTHER PUBLICATIONS

Office Action issued May 27, 2023, in corresponding Chinese Patent Application No. 202080000351.6 (with English Translation), 14 pages.

(Continued)

*Primary Examiner* — Mohammad S Adhami
(74) *Attorney, Agent, or Firm* — Oblon, McClelland, Maier & Neustadt, L.L.P.

(57) ABSTRACT

The embodiments of the present disclosure relate to a communication processing method, a communication processing device and a computer storage medium. The communication processing method which may be applied to a first user equipment (UE) includes: when the first UE performs sidelink communication with a second UE, in response to determining or predicting that In Device Coexistence (IDC) interference is present in a sidelink, sending IDC interference indication information to the second UE or a base station.

15 Claims, 5 Drawing Sheets

When performing sidelink communication with a second UE, in response to determining or predicting that IDC interference is present in a sidelink, sending IDC interference indication information to the second UE or a base station

S11

(58) Field of Classification Search

CPC ..... H04W 70/20; H04W 70/21; H04W 70/23; H04W 70/231; H04W 70/2527; H04W 70/25; H04W 70/27

See application file for complete search history.

(56) References Cited

U.S. PATENT DOCUMENTS

| | | | | |
|---|---|---|---|---|
| 2013/0114516 A1* | 5/2013 | Koo | | H04B 15/00 |
| | | | | 455/501 |
| 2013/0114583 A1* | 5/2013 | Park | | H04W 52/0216 |
| | | | | 370/338 |
| 2013/0203418 A1* | 8/2013 | Jang | | H04W 72/21 |
| | | | | 455/436 |
| 2013/0242830 A1* | 9/2013 | Lee | | H04W 76/28 |
| | | | | 370/329 |
| 2013/0242833 A1* | 9/2013 | Ahn | | H04W 48/06 |
| | | | | 370/311 |
| 2015/0156743 A1 | 6/2015 | Lee et al. | | |
| 2015/0195865 A1 | 7/2015 | Lee et al. | | |
| 2015/0208452 A1 | 7/2015 | Lee et al. | | |
| 2015/0257196 A1* | 9/2015 | Lee | | H04W 8/24 |
| | | | | 370/328 |
| 2015/0296526 A1 | 10/2015 | Behravan et al. | | |
| 2015/0296535 A1 | 10/2015 | Lee et al. | | |
| 2015/0382257 A1* | 12/2015 | Jang | | H04W 76/27 |
| | | | | 370/331 |
| 2016/0205581 A1* | 7/2016 | Lee | | H04W 72/1215 |
| | | | | 370/329 |
| 2016/0316488 A1* | 10/2016 | Ko | | H04W 52/0216 |
| 2017/0070986 A1 | 3/2017 | Lee et al. | | |
| 2017/0196036 A1 | 7/2017 | Lee et al. | | |
| 2017/0222862 A1 | 8/2017 | Li et al. | | |
| 2017/0339689 A1 | 11/2017 | Lee et al. | | |
| 2018/0199330 A1 | 7/2018 | Lee et al. | | |
| 2018/0263048 A1 | 9/2018 | Ingale et al. | | |
| 2019/0261348 A1 | 8/2019 | Lee et al. | | |
| 2020/0260463 A1* | 8/2020 | Lovlekar | | H04W 76/15 |

FOREIGN PATENT DOCUMENTS

| | | | | |
|---|---|---|---|---|
| CN | 103796214 A | 5/2014 | | |
| CN | 104541539 A | 4/2015 | | |
| CN | 108401537 A | 8/2018 | | |
| CN | 110651509 A | 1/2020 | | |
| WO | WO-2013166722 A1 * | 11/2013 | ........... | H04B 1/1081 |
| WO | WO-2014014326 A1 * | 1/2014 | ........... | H04W 24/08 |

OTHER PUBLICATIONS

LG Electronics Inc., "Introduction of V2V services based on LTE sidelink", 3GPP TSG-RAN2 Meeting 95, R2-165836, Gothenburg, Sweden, Aug. 22-26, 2016, 21 pages.

Kangkang Fan et al., "Research on the interference control and resource allocation in D2D communication", Journal of Communications, vol. 39, No. 11, Nov. 25, 2018, 9 pages.

Combined Chinese Office Action and Search Report issued Sep. 27, 2022 in Chinese Patent Application No. 202080000351.6 (with unedited computer generated English Translation of Office Action only), 22 pages.

Written Opinion of the International Searching Authority issued Nov. 24, 2020 in PCT/CN2020/076255 (with unedited English Translation), 8 pages.

Intel Corporation, "LTE part capability size reduction for EN-DC (1038, 040 inRIL36.331, I077 in RIL38.331)", 3GPP TSG RAN WG2 Meeting Ad hoc1801, R2-1800911, Jan. 22-26, 2018, 142 pages.

International Search Report mailed on Nov. 24, 2020 in PCT/CN2020/076255 filed on Feb. 21, 2020, 4 pages).

* cited by examiner

When performing sidelink communication with a second UE, in response to determining or predicting that IDC interference is present in a sidelink, sending IDC interference indication information to the second UE or a base station

S11

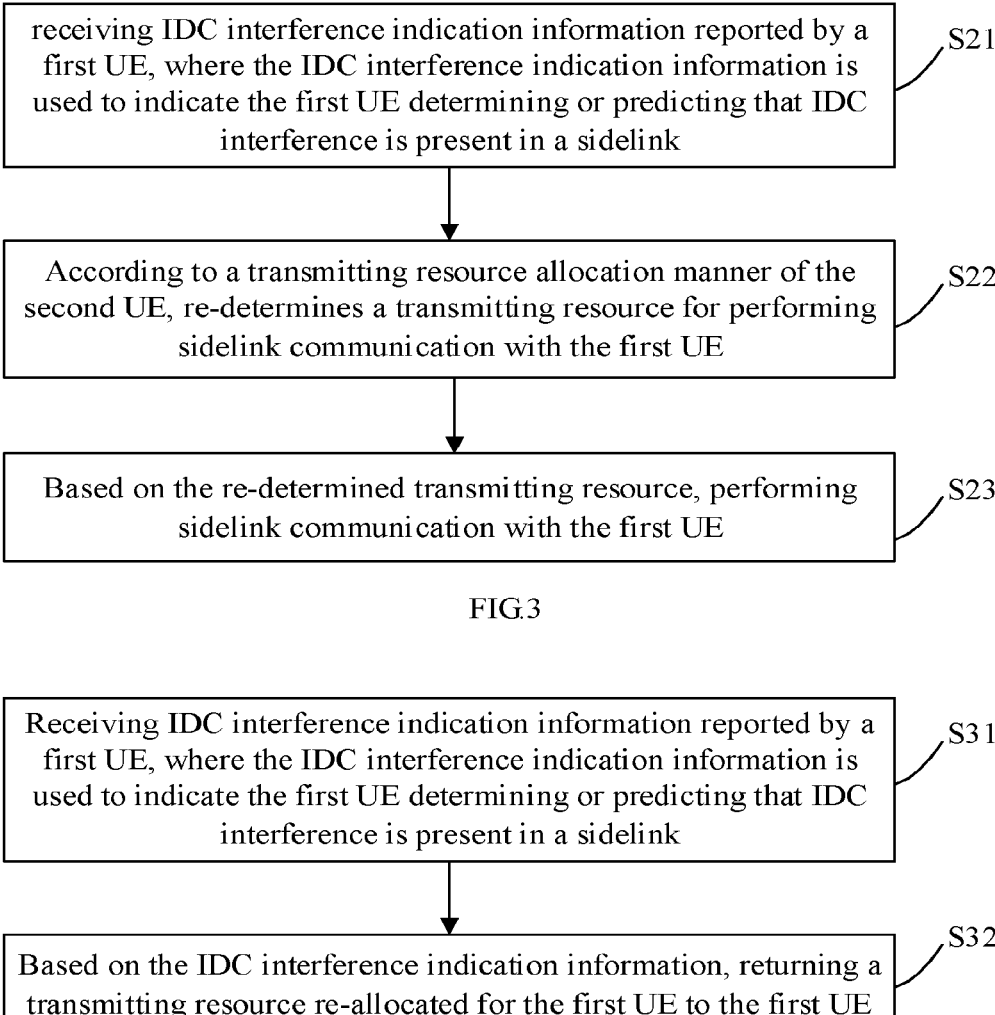

receiving IDC interference indication information reported by a first UE, where the IDC interference indication information is used to indicate the first UE determining or predicting that IDC interference is present in a sidelink — S21

According to a transmitting resource allocation manner of the second UE, re-determines a transmitting resource for performing sidelink communication with the first UE — S22

Based on the re-determined transmitting resource, performing sidelink communication with the first UE — S23

FIG.3

Receiving IDC interference indication information reported by a first UE, where the IDC interference indication information is used to indicate the first UE determining or predicting that IDC interference is present in a sidelink — S31

Based on the IDC interference indication information, returning a transmitting resource re-allocated for the first UE to the first UE — S32

FIG.4

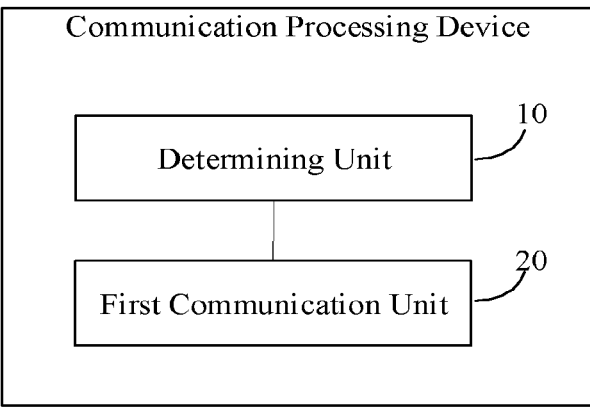

Communication Processing Device

Determining Unit — 10

First Communication Unit — 20

FIG.5

COMMUNICATION PROCESSING METHOD AND DEVICE, AND COMPUTER STORAGE MEDIUM

CROSS-REFERENCE TO RELATED APPLICATIONS

This application is U.S. national phase of PCT international application No. PCT/CN2020/076255 filed on Feb. 21, 2020, the disclosure of which is incorporated herein by reference in its entirety.

BACKGROUND OF THE INVENTION

Field of the Invention

The present disclosure relates to communication technologies, and in particular to a communication processing method, a communication processing device, and a computer storage medium.

Description of the Related Art

Sidelink is a direct communication technology employed for communication between User Equipment (UE) and UE. The sidelink includes two communication modes, where one is a communication mode based on base station resource scheduling, that is, resource adopted for transmitting information between UE and UE is scheduled by a base station; the other is that a UE autonomously selects a resource to perform information transmission between UE and UE, where selectable resources are pre-configured by a network and sent to the UE. For the mode in which a UE autonomously selects a resource to perform sidelink transmission, the network configures a transmitting resource pool and a receiving resource pool for the UE. If one UE is to communicate with another UE, the transmitting resource pool of the one UE must be included in the receiving resource pool of the other UE.

In the related arts, for the mode in which a UE autonomously selects a resource to perform sidelink transmission, it is possible that the transmission/receiving resource pools determined by two UEs are right affected by In Device Coexistence (IDC) interference. But there is no solution available to solve the problem concerning IDC interference until now.

SUMMARY OF THE INVENTION

The present disclosure provides a communication processing method, a communication processing device and a computer storage medium.

According to a first aspect of embodiments of the present disclosure, there is provided a communication processing method, performed by a first UE and including: when the first UE performs sidelink communication with a second UE, in response to determining or predicting that IDC interference is present in a sidelink, sending IDC interference indication information to the second UE or a base station.

According to a second aspect in embodiments of the present disclosure, there is provided a communication processing method, performed by a second UE and including: receiving IDC interference indication information reported by a first UE, where the IDC interference indication information is used to indicate the first UE determining or predicting that IDC interference is present in a sidelink;

according to a transmitting resource allocation manner of the second UE, re-determining a transmitting resource for performing sidelink communication with the first UE; based on the re-determined transmitting resource, performing sidelink communication with the first UE.

According to a third aspect of embodiments of the present disclosure, there is provided a communication processing method, performed by a base station and including: receiving IDC interference indication information reported by a first UE, where the IDC interference indication information is used to indicate the first UE determining or predicting that IDC interference is present in a sidelink; based on the IDC interference indication information, returning a transmitting resource re-allocated for the first UE to the first UE.

According to a fourth aspect of embodiments of the present disclosure, there is provided a communication processing device, performed by a first UE and including: a determining unit, configured to determine or predict whether IDC interference is present in a sidelink; a first communication unit, configured to, during a sidelink communication with a second UE, if it is determined or predicted that IDC interference is present in the sidelink, send IDC interference indication information to the second UE or a base station; receive a solution for solving the IDC interference which is returned based on IDC interference indication information.

According to a fifth aspect of embodiments of the present disclosure, there is provided a communication processing device, performed by a second UE and including: a second communication unit, configured to receive IDC interference indication information reported by a first UE, where the IDC interference indication information is used to indicate the first UE determining or predicting that IDC interference is present in a sidelink; a first processing unit, configured to, according to a transmitting resource allocation manner of the second UE, re-determine a transmitting resource for performing sidelink communication with the first UE; the second communication unit is configured to perform sidelink communication with the first UE based on the re-determined transmitting resource.

According to a sixth aspect of embodiments of the present disclosure, there is provided a communication processing device, performed by a base station and including: a third communication unit, configured to receive IDC interference indication information from a first UE, where the IDC interference indication information is used to indicate the first UE determining or predicting that IDC interference is present in a sidelink; a second processing unit, configured to re-allocate a transmitting resource for the first UE based on the IDC interference indication information; where the third communication unit is further configured to return the transmitting resource re-allocated for the first UE to the first UE.

According to a seventh aspect of embodiments of the present disclosure, there is provided a communication processing device, including: a processor; a memory storing processor-executable instructions; where the processor is configured to execute the executable instructions to perform the communication processing method according to any of the above technical solutions applied to the first UE and/or the second UE.

According to an eighth aspect of embodiments of the present disclosure, there is provided a communication processing device, including: a processor; a memory storing processor-executable instructions; where the processor is configured to execute the executable instructions to perform the communication processing method according to any technical solution applied to the base station.

According to a ninth aspect of embodiments of the present disclosure, there is provided a computer storage medium storing executable instructions, where the executable instructions are executed by a processor to perform the communication processing method according to any of the above technical solutions applied to the first UE and/or the second UE.

According to a tenth aspect of embodiments of the present disclosure, there is provided a computer storage medium storing executable instructions, where the executable instructions are executed by a processor to perform the communication processing method according to any of the above technical solutions applied to the base station.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

FIG. 3 illustrates a second flowchart of a communication processing method according to an example of the present disclosure.

FIG. 4 illustrates a third flowchart of a communication processing method according to an example of the present disclosure.

FIG. 5 illustrates a first block diagram of a communication processing device according to an example of the present disclosure.

DETAILED DESCRIPTION OF THE PREFERRED EMBODIMENTS

Figures 1, 2:
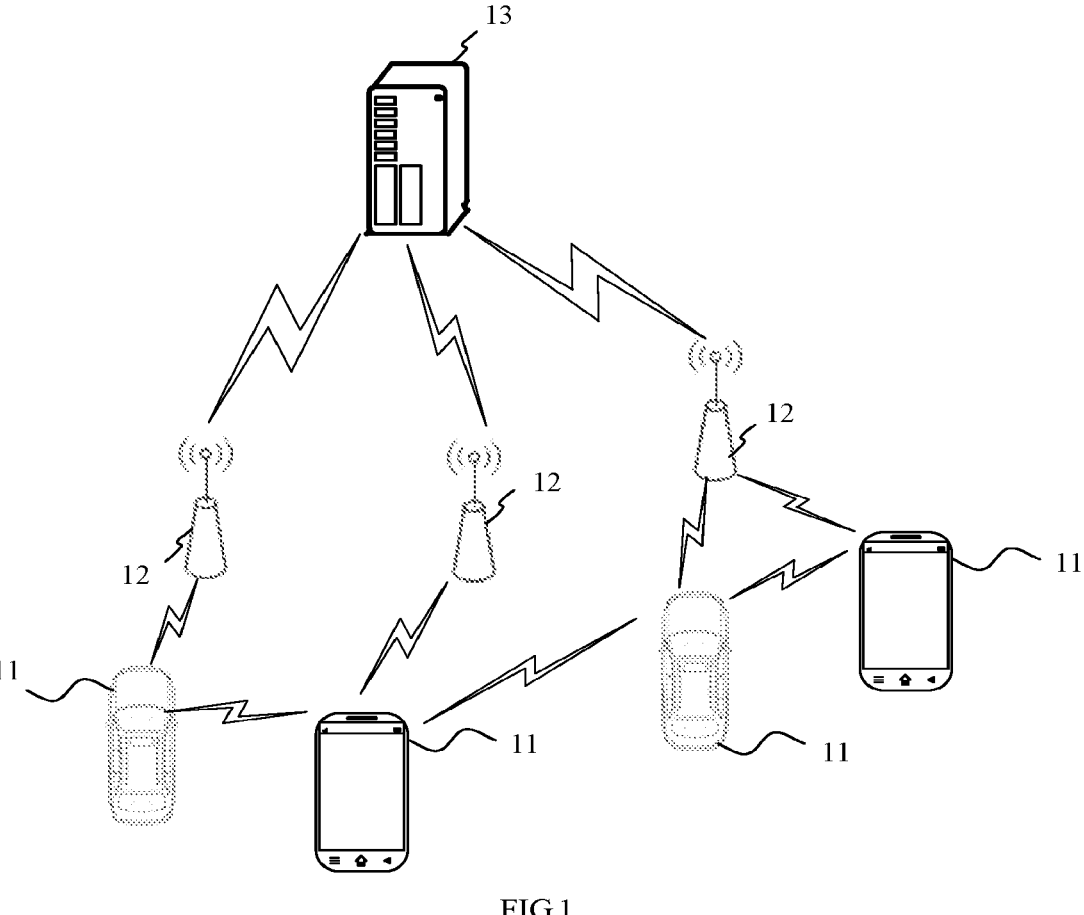
FIG. 1 illustrates a structural schematic diagram of a wireless communication system according to an example of the present disclosure.
FIG. 2 illustrates a first flowchart of a communication processing method according to an example of the present disclosure.

Examples will be described in detail herein, with the illustrations thereof represented in the drawings. When the following descriptions involve the drawings, like numerals in different drawings refer to like or similar elements unless otherwise indicated. The implementations described in the following examples do not represent all implementations consistent with the present disclosure. Rather, they are merely examples of devices and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

FIG. 1 illustrates a structural schematic diagram of a wireless communication system according to an embodiment of the present disclosure. As shown in FIG. 1, the wireless communication system is a communication system based on cellular mobile communication technology and may include a plurality of terminals 11 and a plurality of base stations 12.

The terminal 11 may be indicate a device that provides voice and/or data connectivity to the user. The terminal 11 may communicate with one or more core networks through a radio access network (RAN). The terminal 11 may be a terminal for internet of things, such as a sensor device, a mobile phone (or called cellular phone), and a computer having a terminal for internet of things. For example, the terminal 11 may be a device which is fixed, portable, pocket-sized, handheld, computer-inbuilt or vehicle-mounted, such as station (STA), subscriber unit, subscriber station, mobile station, mobile, remote station, access point, remote terminal, access terminal, user terminal, user agent, user device, or UE. Optionally, the terminal 11 may be a device of an unmanned aerial vehicle. Optionally, the terminal 11 may be a vehicle-mounted device, such as a trip computer having wireless communication function, or a wireless communication device externally connected to a trip computer. Optionally, the terminal 11 may be a roadside device, such as a road lamp, signal lamp or other roadside devices having wireless communication function.

The base station 12 may be a network side device in a wireless communication system. The wireless communication system may be a fourth-generation mobile communication (4G) system, which is also called Long Term Evolution (LTE) system. Optionally, the wireless communication system may be a 5G system, which is also called new radio (NR) system or 5G NR system. Optionally, the wireless communication system may be a next generation system of the 5G system. An access network in the 5G system may be referred to as New Generation-Radio Access Network (NG-RAN). Optionally, the wireless communication system may also be referred to as Machine-Type Communication (MTC) system.

The base station 12 may be an evolved node base station (eNB) employed in the 4G system. Optionally, the base station 12 may be a base station adopting centralized distributed architecture (next generation node base station, gNB) in the 5G system. When adopting the centralized distributed architecture, the base station 12 usually includes a central unit (CU) and at least two distributed units (DU).

In the central unit, protocol stacks of a Packet Data Convergence Protocol (PDCP) layer, a Radio Link Control (RLC) layer and a Media Access Control (MAC) layer are disposed; in the distributed unit, a physical (PHY) layer protocol stack is disposed. The specific implementations of the base station 12 are not limited to the embodiments of the present disclosure.

The base station 12 and the terminal 11 may establish wireless connection therebetween through wireless radio. In different implementations, the wireless radio may be a wireless radio based on the fourth generation mobile communication network technology (4G) standard; or, the wireless radio may be a wireless radio based on the fifth generation mobile communication network technology (5G) standard, for example, the wireless radio is a new radio; or, the wireless radio may be a wireless radio based on a next generation mobile communication network technology standard of 5G.

In some embodiments, the terminals 11 may establish end to end (E2E) connection therebetween, for example, in the scenarios such as vehicle to vehicle (V2V) communication, vehicle to Infrastructure (V2I) communication, and vehicle to pedestrian (V2P) communication and the like in vehicle to everything (V2X) communication.

In some embodiments, the above wireless communication system may further include a network management device 13.

A plurality of base stations 12 are connected to the network management device 13 respectively. The network management device 13 may be a core network device in the wireless communication system. For example, the network management device 13 may be a Mobility Management Entity (MME) in an Evolved Packet Core (EPC) network. Optionally, the network management device may be other core network device, such as Serving GateWay (SGW), Public Data Network GateWay (PGW), Policy and Charging Rules Function (PCRF), or Home Subscriber Server (HSS). The implementation morphology of the network management device 13 is not limited to the embodiments of the present disclosure.

In the related arts, for a device configured with modules for Long Term Evolution (LTE) and for Wi-Fi/Bluetooth/Global Navigation Satellite System (GNSS) at the same time, where modules for LTE and modules for Wi-Fi/Bluetooth/GNSS adopt different frequency bands, for example, modules for Wi-Fi/Bluetooth/GNSS adopt Industrial Scientific Medical (ISM) frequency band, when the device transmits or receives signal(s), mutual interference between LTE frequency band and ISM frequency band may occur and prevent the device from receiving signal(s) correctly, thus affecting the device's normal work. For the problem concerning interference between LTE frequency band and ISM frequency band in the device, an IDC interference solution is introduced into the LTE. Specifically, when IDC interference occurs and the UE cannot solve it on itself, the UE may report IDC interference indication information to a network, where the IDC interference indication information indicates frequency bands which are affected and an interference direction (such as LTE interferes ISM, or ISM interferes LTE, or mutually interferes). For uplink (UL) carrier aggregation and multi-rat dual connectivity, the UE reports an affected carrier combination (cross modulation interference and harmonic interference). The UE may also report TDM auxiliary information so that the network can select proper parameters to adopt a TDM based solution. The IDC interference reported by the UE may be ongoing IDC interference or IDC interference which is anticipated to occur. After receiving the IDC interference indication information of the UE, the network may adopt a solution based on TDM or frequency division multiplexing (FDM) to solve the problem concerning IDC interference.

Sidelink is a direct communication technology employed for communication between UE and UE. The sidelink includes two communication modes, where one is a communication based on base station resource scheduling, that is, resource adopted for transmitting information between UE and UE is scheduled by a base station; the other is that a UE autonomously selects a resource to perform information transmission between UE and UE, where selectable resources are pre-configured by a network and sent to the UE. For the latter mode, the network configures a transmitting resource pool and a receiving resource pool for the UE. If one UE is to communicate with another UE, the transmitting resource pool of the one UE must be included in the receiving resource pool of the other UE.

For the mode in which a UE autonomously selects a resource to perform sidelink transmission, it is possible that the transmission/receiving resource pools determined by two UEs are right affected by IDC interference. But there is no solution available to solve the problem concerning IDC interference until now.

Based on the above wireless communication system, the examples of the present disclosure are provided to solve the problem concerning IDC interference on a sidelink under an autonomous resource selection mode.

FIG. 2 illustrates a first flowchart of a communication processing method according to an example of the present disclosure. As shown in FIG. 2, the communication processing method is applied to a UE, for example, a first UE. The method includes the following steps.

At step S11, when the first UE performs sidelink communication with a second UE, in response to determining or predicting that IDC interference is present in a sidelink, the first UE sends IDC interference indication information to the second UE or a base station.

In this way, the first UE can receive a solution for solving the IDC interference which is returned by the second UE or the base station based on the IDC interference indication information, so as to solve the problem concerning IDC interference on the sidelink.

Furthermore, the method may include the following step.

At step S12 (not shown in FIG. 2), the first UE receives a solution for solving the IDC interference which is returned by the second UE or the base station based on the IDC interference indication information.

By reporting the IDC interference indication information to the second UE or the base station, the first UE can receive the solution for solving the IDC interference returned by the second UE or the base station based on the IDC interference indication information, and therefore the problem concerning IDC interference on the sidelink can be effectively solved by coordination between the UEs or auxiliary coordination from the base station.

In some embodiments, the IDC interference indication information further includes one or more suggested solutions to solve IDC interference.

In some embodiments, when determining or predicting that the IDC interference is present in the sidelink, sending the IDC interference indication information to the second UE or the base station may include, if the IDC interference is the sidelink being interfered by ISM, sending the IDC interference indication information to the second UE. Where the sidelink being interfered by ISM includes data reception of the sidelink being interfered by transmission of an ISM frequency band. In this way, when it is determined or predicted that IDC interference is present in the sidelink and the IDC interference is the sidelink being interfered by ISM, the first UE sends the IDC interference indication information to the second UE to solve the problem concerning IDC interference through mutual coordination between the UEs.

In some embodiments, when determining or predicting that the IDC interference is present in the sidelink, sending the IDC interference indication information to the second UE or the base station includes, if the IDC interference is the ISM being interfered by the sidelink, determining whether a sidelink transmitting resource is scheduled by the base station, when determining the sidelink transmitting resource is scheduled by the base station, sending the IDC interference indication information to the base station. Where the ISM being interfered by the sidelink includes data transmission of the sidelink interfering data reception of the ISM frequency band. In this way, when it is determined or predicted that IDC interference is present in the sidelink, the IDC interference is the ISM being interfered by the sidelink and the sidelink transmitting resource is scheduled by the base station, the first UE sends the IDC interference indication information to the base station to solve the problem concerning IDC interference through auxiliary coordination from the base station.

In some embodiments, the IDC interference indication information may further include IDC interference cause indication information, where the IDC interference cause indication information is used to indicate a cause leading to the IDC interference. Where the cause leading to the IDC interference may include interference manner or direction. Therefore, the IDC interference indication information indicates not only the presence of the IDC interference in the sidelink but also a cause leading to the IDC interference, which helps the base station or the second UE quickly determine a solution for solving the problem concerning IDC interference.

In some embodiments, the IDC interference indication information may further include TDM auxiliary information and/or FDM auxiliary information, where the TDM auxiliary information is used to provide one or more suggested solutions based on TDM; the FDM auxiliary information is used to provide one or more suggested solutions based on FDM. Thus, the base station or the second UE can determine a solution for solving the problem concerning IDC interference based on the TDM auxiliary information and/or FDM auxiliary information.

In some embodiments, the FDM auxiliary information includes indication information on an IDC-interference-affected receiving resource pool and/or receiving resource frequency domain position of the first UE. In this way, based on the FDM auxiliary information, the base station or the second UE can adjust a transmitting resource pool and/or transmitting resource frequency domain position of the second UE. That is, a transmitting resource pool and/or transmitting resource frequency domain position of the second UE is selected from receiving resource pools and/or receiving resource frequency domain positions other than the IDC-interference-affected receiving resource pool and/or receiving resource frequency domain position.

In some embodiments, the FDM auxiliary information includes indication information on a suggested transmitting resource pool and/or transmitting resource frequency domain position of the second UE. In this way, based on the FDM auxiliary information, the base station or the second UE can adjust a transmitting resource pool and/or transmitting resource frequency domain position of the second UE.

That is, a transmitting resource pool and/or transmitting resource frequency domain position of the second UE is selected from the suggested transmitting resource pools and/or transmitting resource frequency domain positions of the second UE.

In some embodiments, the method may further include receiving configuration information sent by the base station, where sending the IDC interference indication information to the second UE or the base station may include:

if the configuration information indicates the base station is to receive the IDC interference indication information, sending the IDC interference indication information to the base station, if the configuration information indicates the base station does not receive the IDC interference indication information, sending the IDC interference indication information to the second UE.

In this way, when the first UE performs sidelink communication with the second UE, in response to determining or predicting that IDC interference is present in the sidelink, the first UE can, based on the configuration information sent by the base station, determine the IDC interference indication information is to be reported to either the base station or the second UE.

In some embodiments, sending the IDC interference indication information to the second UE or the base station includes, if the first UE is out of coverage (OOC) of the base station, sending the IDC interference indication information to the second UE, if the first UE is in coverage (IC) of the base station, sending the IDC interference indication information to the base station. In this way, it is guaranteed that the sent IDC interference indication information can be received so as to quickly solve the existing problem concerning IDC interference.

In the technical solution according to the embodiments of the present disclosure, when the first UE performs sidelink communication process with the second UE, in response to determining or predicting that IDC interference is present in a sidelink, the first UE sends the IDC interference indication information to the second UE or the base station and then receives a solution for solving the IDC interference which is returned by the second UE or the base station based on the IDC interference indication information, such that the problem concerning IDC interference on the sidelink can be solved effectively.

FIG. 3 illustrates a second flowchart of a communication processing method according to an example of the present disclosure. As shown in FIG. 3, the communication processing method is applied to a UE, for example, a second UE. The method includes the following steps.

At step S21, the second UE receives IDC interference indication information reported by a first UE, where the IDC interference indication information is used to indicate the first UE determining or predicting that IDC interference is present in a sidelink.

At step S22, according to a transmitting resource allocation manner of the second UE, the second UE re-determines a transmitting resource for the second UE performing sidelink communication with the first UE.

At step S23, based on the re-determined transmitting resource, the second UE performs sidelink communication with the first UE.

In some embodiments, according to the transmitting resource allocation manner of the second UE, re-determining a transmitting resource for performing sidelink communication with the first UE includes, when the transmitting resource allocation manner of the second UE is a base station scheduling manner, sending the IDC interference indication information to the base station, and receiving a transmitting resource re-allocated for the second UE which is returned by the base station based on the IDC interference indication information.

In this way, after the second UE receives the IDC interference indication information, if the transmitting resource of the second UE is scheduled by the base station, the second UE sends the IDC interference indication information to its serving base station and the serving base station re-selects a proper transmitting resource for the second UE, such that the problem concerning IDC interference can be avoided.

In some embodiments, according to the transmitting resource allocation manner of the second UE, re-determining a transmitting resource for performing sidelink communication with the first UE includes:

when the transmitting resource allocation manner of the second UE is an autonomously selecting manner, re-selecting a transmitting resource based on the IDC interference indication information.

In this way, after the second UE receives the IDC interference indication information, if its transmitting resource is selected by itself, the second UE re-selects a proper time frequency domain resource to avoid the problem concerning IDC interference.

In some embodiments, the IDC interference indication information may further include TDM auxiliary information and/or FDM auxiliary information; where the TDM auxiliary information is used to provide one or more suggested solutions based on TDM; the FDM auxiliary information is used to provide one or more suggested solutions based on FDM.

In this way, the second UE can determine a solution for solving the problem concerning IDC interference based on the TDM auxiliary information and/or FDM auxiliary information.

In some embodiments, re-determining a transmitting resource for performing sidelink communication with the first UE includes:

determining a TDM based solution supported by the second UE from the suggested solutions based on TDM, and according to the determined TDM based solution, re-determining a transmitting resource for performing sidelink communication with the first UE; and/or, determining a FDM based solution supported by the second UE from the suggested solutions based on FDM, and according to the determined FDM based solution, re-determining a transmitting resource for performing sidelink communication with the first UE.

In this way, based on the TDM auxiliary information and/or FDM auxiliary information carried in the IDC interference indication information, the second UE can quickly determine a transmitting resource for performing sidelink communication with the first UE.

In the technical solutions according to embodiments of the present disclosure, the second UE receives the IDC interference indication information reported by the first UE where the IDC interference indication information is used to indicate the first UE determining or predicting that IDC interference is present in a sidelink; according to the transmitting resource allocation manner of the second UE, the second UE re-determines a transmitting resource for performing sidelink communication with the first UE; according to the re-determined transmitting resource, the second UE performs sidelink communication with the first UE. In this way, the problem concerning IDC interference on the first UE can be effectively solved.

FIG. 4 illustrates a third flowchart of a communication processing method according to an example of the present disclosure. As shown in FIG. 4, the communication processing method is applied to a network device, for example, a base station. The method includes the following steps.

At step S31, the base station receives IDC interference indication information reported by a first UE, where the IDC interference indication information is used to indicate the first UE determining or predicting that IDC interference is present in a sidelink.

At step S32, the base station, based on the IDC interference indication information, returns a transmitting resource re-allocated for the first UE to the first UE. In this way, the base station re-allocates a transmitting resource for the first UE based on the IDC interference indication information reported by the first UE, so as to solve the IDC interference problem.

In some embodiments, the method further includes sending configuration information to the first UE, where the configuration information indicates whether the base station is to receive the IDC interference indication information.

By sending the configuration information to the first UE, based on the configuration information sent by the base station, when the first UE performs sidelink communication with a second UE, in response to determining or predicting that IDC interference is present in a sidelink, the first UE can determine to report the IDC interference indication information to either the base station or the second UE. In this way, it can be effectively avoided that, after the first UE reports the IDC interference indication information, because the serving base station of the first UE does not support the first UE reporting the IDC interference indication information, the problem concerning the IDC interference of the first UE cannot be solved in time.

In some embodiments, the method may further include receiving IDC interference indication information from the second UE, where the IDC interference indication information is used to indicate the first UE determining or predicting that IDC interference is present in a sidelink, based on the IDC interference indication information, re-allocating a transmitting resource for the second UE performing sidelink communication with the first UE. In this way, based on the IDC interference indication information, the base station can re-select a proper transmitting resource for the second UE, so as to avoid the problem concerning IDC interference.

For example, when the IDC interference is the reception of the sidelink being interfered by the transmission of the ISM, the first UE sends the IDC interference indication information to the second UE. After the second UE receives the IDC interference indication information, if the transmitting resource of the second UE is scheduled by the base station, the second UE sends the IDC interference indication information to its serving base station and the serving base station re-selects a proper transmitting resource for the second UE to avoid the problem concerning IDC interference.

FIG. 5 illustrates a first block diagram of a communication processing device according to an example of the present disclosure. The communication processing device can be applied to a network device, for example, a first UE. As shown in FIG. 5, the device includes a determining unit 10 and a first communication unit 20.

The determining unit 10 is configured to determine or predict whether IDC interference is present in a sidelink.

The first communication unit 20 is configured to, during the first UE performing sidelink communication with a second UE, if it is determined or predicted that IDC interference is present in the sidelink, send IDC interference indication information to the second UE or a base station; and receive a solution for solving the IDC interference which is returned by the second UE or the base station based on the IDC interference indication information.

For the device according to the above embodiment, the specific operating manner of various modules in the device has already been described in details in the embodiments of related methods and will not be repeated herein.

In practical applications, the specific structures of the above determining unit 10 and first communication unit 20 may be implemented by a central processing unit (CPU), a micro controller unit (MCU), a digital signal processor (DSP), a programmable logic controller (PLC) or the like in the communication processing device or the terminal to which the communication processing device is provided.

The communication processing device in this embodiment may be disposed at a UE, for example, the first UE.

Those skilled in the art should understand that the functions of various processing modules in the communication processing device according to the embodiment of the present disclosure can be understood by referring to the relevant descriptions of the above communication processing method applied to the UE, for example, the first UE. The various processing modules in the communication processing device according to the embodiment of the present disclosure may be implemented by an analog circuit for implementing the functions described in the embodiment of the present disclosure, or by running a software to execute the functions described in the embodiment of the present disclosure on a terminal.

The communication processing device described in the embodiment of the present disclosure can effectively solve the problem concerning IDC interference on a sidelink.

Figure 6:
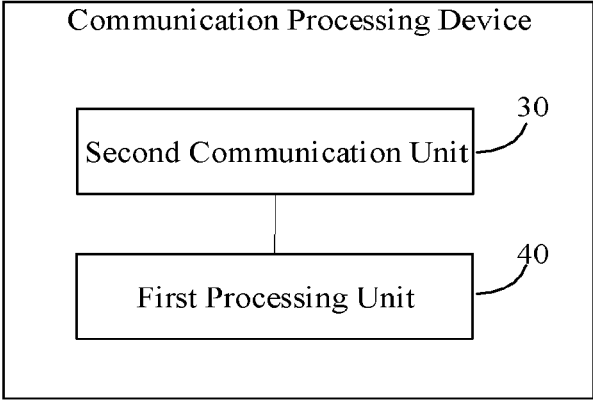
FIG. 6 illustrates a second block diagram of a communication processing device according to an example of the present disclosure.

FIG. 6 illustrates a second block diagram of a communication processing device according to an example of the present disclosure. The communication processing device can be applied to a UE, for example, a second UE. As shown in FIG. 6, the device includes a second communication unit 30 and a first processing unit 40.

The second communication unit 30 is configured to receive IDC interference indication information reported by a first UE, where the IDC interference indication information is used to indicate the first UE determining or predicting that IDC interference is present in a sidelink.

The first processing unit 40 is configured to, according to a transmitting resource allocation manner of the second UE, re-determine a transmitting resource for performing sidelink communication with the first UE; the second communication unit is configured to perform sidelink communication with the first UE based on the re-determined transmitting resource.

For the device according to the above embodiment, the specific operating manner of various modules in the device has already been described in details in the embodiments of related methods and will not be repeated herein.

In practical applications, the specific structures of the above second communication unit 30 and first processing unit 40 may be implemented by a CPU, an MCU, a DSP, a PLC or the like in the communication processing device or the terminal to which the communication processing device is provided.

The communication processing device in this embodiment may be disposed at a UE, for example, the second UE.

Those skilled in the art should understand that the functions of various processing modules in the communication processing device according to the embodiment of the present disclosure can be understood by referring to the relevant descriptions of the above communication processing method applied to a UE, for example, a second UE. The various processing modules in the communication processing device according to the embodiment of the present disclosure may be implemented by an analog circuit for implementing the functions described in the embodiment of the present disclosure, or by running a software to execute the functions described in the embodiment of the present disclosure on a terminal.

The communication processing device described in the embodiment of the present disclosure can effectively solve the problem concerning IDC interference on a sidelink.

Figure 7:
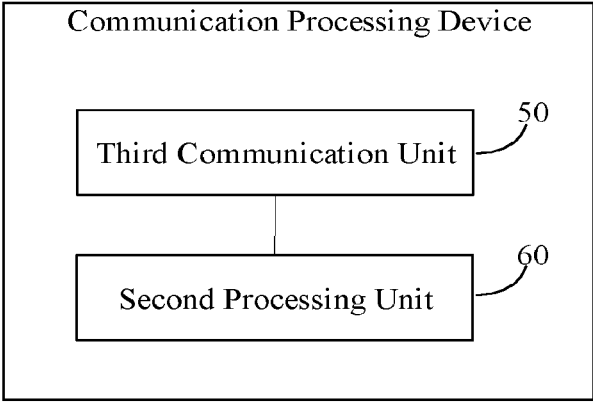
FIG. 7 illustrates a third block diagram of a communication processing device according to an example of the present disclosure.

FIG. 7 illustrates a third block diagram of a communication processing device according to an example of the present disclosure. The communication processing device can be applied to a network device, for example, a base station. As shown in FIG. 7, the device includes a third communication unit 50 and a second processing unit 60.

The third communication unit 50 is configured to receive IDC interference indication information from a first UE, where the IDC interference indication information is used to indicate the first UE determining or predicting that IDC interference is present in a sidelink.

The second processing unit 60 is configured to, based on the IDC interference indication information, re-allocate a transmitting resource for the first UE.

The third communication unit 50 may be further configured to return the transmitting resource re-allocated for the first UE to the first UE.

In some embodiments, the third communication unit 50 may be further configured to receive IDC interference indication information from a second UE, where the IDC interference indication information is used to indicate the first UE determining or predicting that IDC interference is present in a sidelink; the second processing unit 60 may be further configured to, based on the IDC interference indication information, re-allocate a transmitting resource for the second UE performing sidelink communication with the first UE.

For the device according to the above embodiment, the specific operating manner of various modules in the device has already been described in details in the embodiments of related methods and will not be repeated herein.

In practical applications, the specific structures of the above third communication unit 50 and second processing unit 60 may be implemented by a CPU, an MCU, a DSP, a PLC or the like in the communication processing device or the terminal to which the communication processing device is provided.

The communication processing device in this embodiment may be disposed at a network device, for example, the base station.

Those skilled in the art should understand that the functions of various processing modules in the communication processing device according to the embodiment of the present disclosure can be understood by referring to the relevant descriptions of the above communication processing method applied to a network device, for example, a base station. The various processing modules in the communication processing device according to the embodiment of the present disclosure may be implemented by an analog circuit for implementing the functions described in the embodiment of the present disclosure, or by running a software to execute the functions described in the embodiment of the present disclosure on a terminal.

The communication processing device described in the embodiment of the present disclosure can effectively solve the problem concerning IDC interference on a sidelink.

Figure 8:
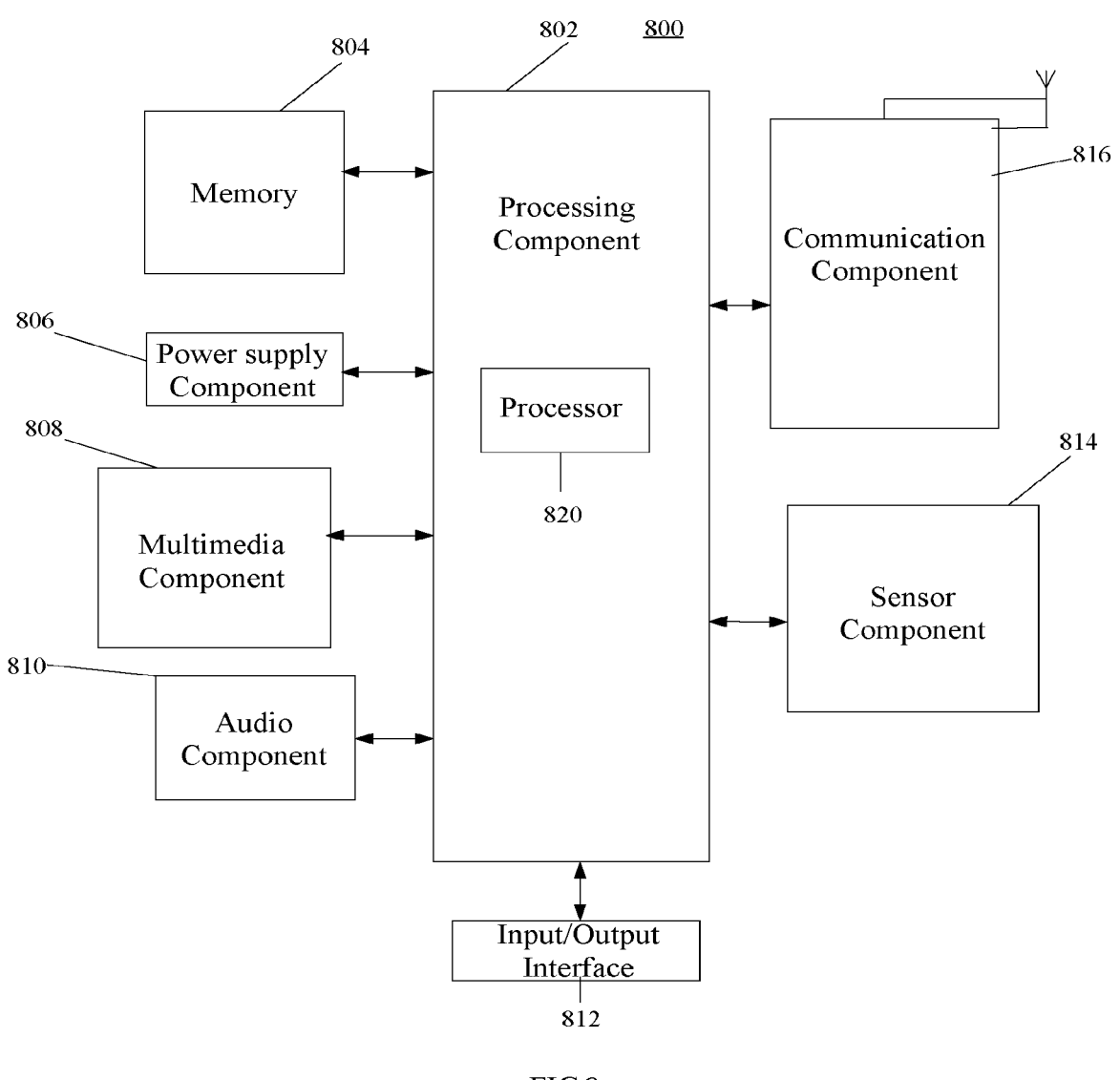
FIG. 8 illustrates a block diagram illustrating a device 800 for communication processing according to an example of the present disclosure.

FIG. 8 illustrates a block diagram of an apparatus 800 for communication processing according to an example of the present disclosure. For example, the apparatus 800 may be a mobile phone, a computer, a digital broadcast terminal, a message transceiver, a game console, a tablet device, a medical device, a fitness device, a personal digital assistant, and the like.

As shown in FIG. 8, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the apparatus 800, such as operations associated with display, phone calls, data communications, camera operations, and recording operations. The processing component 802 may include one or more processors 820 to execute instructions to complete all or part of the steps in the above methods. In addition, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support the operations of the apparatus 800. Examples of such data include instructions for any applications or methods operated on the apparatus 800, such as contact data, phonebook data, messages, pictures, videos, and so on. The memory 804 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the apparatus 800. The power supply component 806 may include a power supply management system, one or more power supplies, and other components associated with generating, managing and distributing power for the apparatus 800.

The multimedia component 808 includes a screen that provides an output interface between the apparatus 800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 808 includes one or more front cameras and/or one or more rear cameras. When the apparatus 800 is in an operation mode, such as a shooting mode or a video mode, the front cameras and/or the rear cameras may receive external multimedia data. Each of the front cameras and rear cameras may be a fixed optical lens system or have a focal length and an optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 may also include a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the apparatus 800. For example, the sensor component 814 may detect an open/closed state of the apparatus 800, and the relative positioning of components, for example, the component is a display and a keypad of the apparatus 800. The sensor component 814 may also detect a position change of the apparatus 800 or a component of the apparatus 800, the presence or absence of a user's contact with the apparatus 800, the orientation or acceleration/deceleration of the apparatus 800 and a temperature change of the apparatus 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on any communication standard, such as a Wi-Fi network, a second-generation (2G) network or a third-generation (3G) network, or a combination thereof. In an example, the communication component 816 may receive broadcast signals or broadcast associated information from an external broadcast management system via a broadcast channel. In an example, the communication component 816 may also include a near field communication (NFC) module to facilitate short range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic elements for performing the above communication processing method applied to a user terminal.

In an example, there is also provided a non-transitory computer storage medium including executable instructions, for example, the memory 804 including executable instructions, where the executable instructions are executable by the processor 820 of the apparatus 800 to perform the method as described above. For example, the non-transitory computer storage medium may be a ROM, a Random Access Memory (RAM), a CD-ROM, a magnetic tape, a floppy disk, an optical data storage device and the like.

Figure 9:
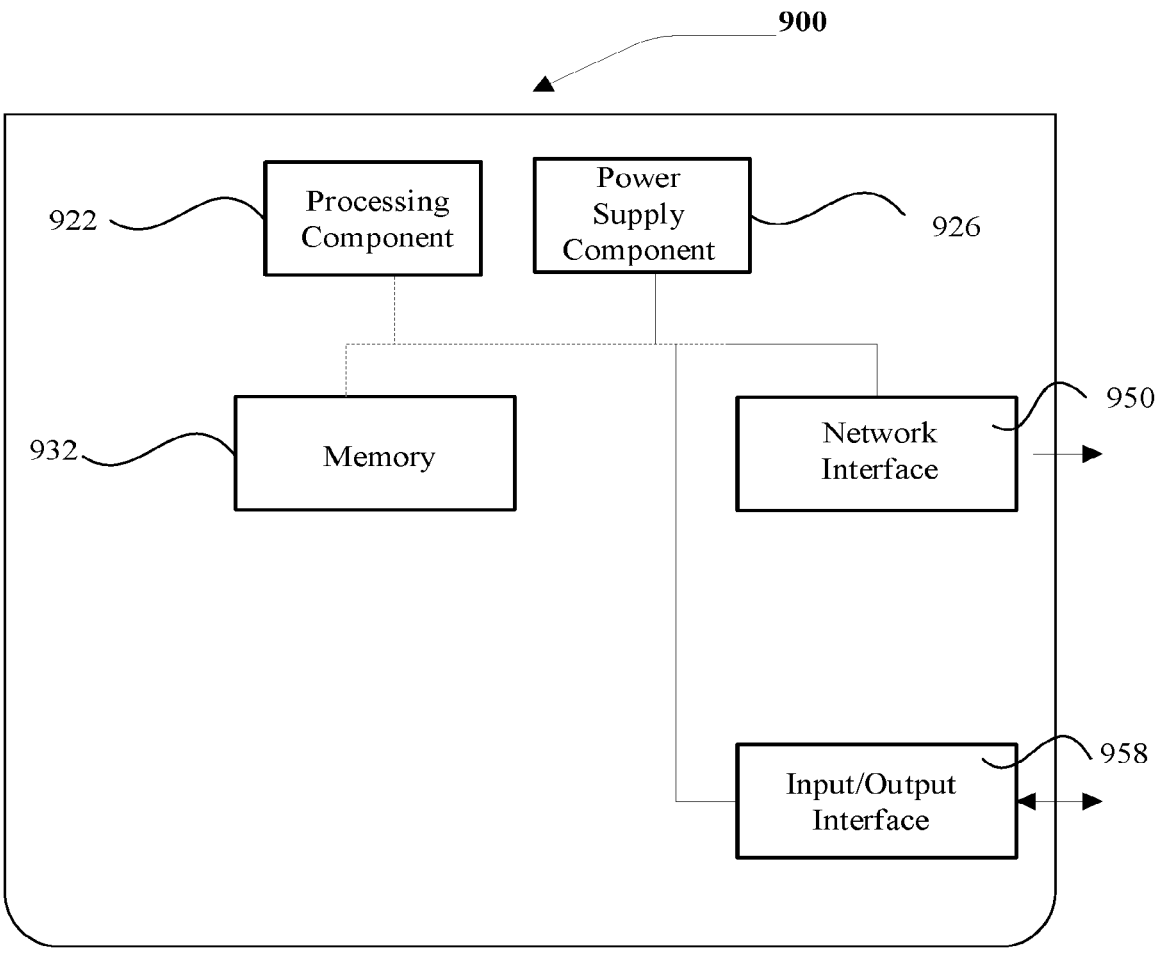
FIG. 9 illustrates a block diagram illustrating a device 900 for communication processing according to an example of the present disclosure.

FIG. 9 illustrates a block diagram of an apparatus 900 for communication processing according to an example of the present disclosure. For example, the apparatus 900 may be provided as a server. As shown in FIG. 9, the apparatus 900 may include a processing component 922 which further includes one or more processors and memory resources represented by a memory 932 for storing instructions executable by the processing component 922, for example, an application program. The application program stored in the memory 932 may include one or more modules, each of which corresponds to one set of instructions. Further, the processing component 922 is configured to execute instructions to perform the above communication processing method applied to the base station.

The apparatus 900 may further include one power supply component 926 configured to execute power management for the apparatus 900, one wired or wireless network interface 950 configured to connect the apparatus 900 to a network, and one I/O interface 958. The apparatus 900 may be operated based on an operating system stored in the memory 932, such as Windows Server™, Mac OS X™, Unix™, Linux™, FreeBSD™ and the like.

The technical solutions provided by the embodiments of the present disclosure have the following beneficial effects. When the first UE performs sidelink communication with the second UE, in response to determining or predicting that IDC interference is present in the sidelink, the first UE sends IDC interference indication to the second UE or the base station and then receives a solution for solving the IDC interference which is returned by the second UE or the base station based on the IDC interference indication information, thereby effectively solving the problem concerning IDC interference on the sidelink.

The technical solutions recorded in the embodiments of the present disclosure can be combined arbitrarily in a case of no conflict.

Other implementations of the present disclosure will be apparent to those skilled in the art from consideration of the specification and practice of the present disclosure herein. The present disclosure is to cover any variations, uses, or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A communication processing method, performed by a first user equipment (UE) and comprising:
receiving configuration information sent by a base station; and
during performing sidelink communication with a second UE, when determining or predicting that In Device Coexistence (IDC) interference is present in a sidelink, sending IDC interference indication information to the second UE or the base station, so that the second UE or the base station re-determines a sidelink transmission resource so as to resolve the IDC interference of industry, science and medicine (ISM) being interfered by the sidelink;
wherein when determining or predicting that the IDC interference is present in the sidelink, sending the IDC interference indication information to the second UE or the base station comprises:
in response to a determination that the IDC interference is the ISM being interfered by the sidelink, determining whether a sidelink transmitting resource is scheduled by the base station;
when determining the sidelink transmitting resource is scheduled by the base station, sending the IDC interference indication information to the base station in response to the configuration information indicating that the base station receives the IDC interference indication information; and
sending the IDC interference indication information to the second UE in response to the configuration information indicating that the base station does not receive the IDC interference indication information.

2. The method of claim 1, wherein the IDC interference indication information further comprises IDC interference cause indication information, the IDC interference cause indication information is used to indicate a cause leading to the IDC interference.

3. The method of claim 1, wherein the IDC interference indication information further comprises at least one of time division multiplexing (TDM) auxiliary information or frequency division multiplexing (FDM) auxiliary information;
wherein the TDM auxiliary information is used to provide one or more suggested solutions based on TDM, the FDM auxiliary information is used to provide one or more suggested solutions based on FDM.

4. The method of claim 3, wherein the FDM auxiliary information comprises indication information on an IDC-interference-affected receiving resource pool and/or receiving resource frequency domain position of the first UE.

5. The method of claim 3, wherein the FDM auxiliary information comprises:
indication information on a suggested transmitting resource pool and/or transmitting resource frequency domain position of the second UE.

6. A communication processing method, performed by a second User Equipment (UE) and comprising:
receiving In Device Coexistence (IDC) interference indication information reported by a first UE, wherein the IDC interference indication information is used to indicate the first UE determining or predicting that IDC interference is present in a sidelink, and the IDC interference is the ISM being interfered by the sidelink, and the IDC interference indication information is sent to the second UE by the first UE in response to configuration information received by the first UE from a base station indicating that the base station does not receive the IDC interference indication information;
according to a transmitting resource allocation manner of the second UE, re-determining a transmitting resource for performing sidelink communication with the first UE, so as to resolve the IDC interference of the ISM being interfered by the sidelink;
based on the re-determined transmitting resource, performing sidelink communication with the first UE.

7. The method of claim 6, wherein according to the transmitting resource allocation manner of the second UE, re-determining a transmitting resource for performing sidelink communication with the first UE comprises:

when determining the transmitting resource allocation manner of the second UE is a base station scheduling manner, sending the IDC interference indication information to the base station;

receiving a transmitting resource re-allocated for the second UE which is returned by the base station based on the IDC interference indication information.

8. The method of claim 6, wherein according to the transmitting resource allocation manner of the second UE, re-determining a transmitting resource for performing sidelink communication with the first UE comprises:

when determining the transmitting resource allocation manner of the second UE is an autonomously selecting manner, based on the IDC interference indication information, re-selecting a transmitting resource.

9. The method of claim 6, wherein the IDC interference indication information further comprises at least one of time division multiplexing (TDM) auxiliary information or frequency division multiplexing (FDM) auxiliary information;

wherein the TDM auxiliary information is used to provide one or more suggested solutions based on TDM, the FDM auxiliary information is used to provide one or more suggested solutions based on FDM.

10. The method of claim 9, wherein re-determining a transmitting resource for performing sidelink communication with the first UE comprises:

determining a TDM-based solution supported by the second UE from the suggested solutions based on TDM, and according to the determined TDM-based solution, re-determining a transmitting resource for performing sidelink communication with the first UE; and/or, determining a FDM-based solution supported by the second UE from the suggested solutions based on FDM, and according to the determined FDM-based solution, re-determining a transmitting resource for performing sidelink communication with the first UE.

11. A communication processing method, performed by a base station, and comprising:

sending configuration information to a first User Equipment (UE), wherein the configuration information is used to indicate whether the base station is to receive In Device Coexistence (IDC) interference indication information;

receiving IDC interference indication information reported by the first UE, wherein the IDC interference indication information is used to indicate the first UE determining or predicting that IDC interference is present in a sidelink, and the IDC interference is the ISM being interfered by the sidelink;

based on the IDC interference indication information, returning a transmitting resource re-allocated for the first UE to the first UE, so as to resolve the IDC interference of the ISM being interfered by the sidelink.

12. The method of claim 11, further comprising:

receiving IDC interference indication information from a second UE, wherein the IDC interference indication information is used to indicate the first UE determining or predicting that IDC interference is present in a sidelink;

based on the IDC interference indication information, re-allocating a transmitting resource for the second UE performing sidelink communication with the first UE.

13. A communication processing apparatus, comprising:

a processor;

a memory storing executable instructions;

wherein the processor is configured to execute the executable instructions to perform the communication processing method according to claim 1.

14. A communication processing apparatus, comprising:

a processor;

a memory storing executable instructions;

wherein the processor is configured to execute the executable instructions to perform the communication processing method according to claim 11.

15. A communication processing apparatus, comprising:

a processor;

a memory storing executable instructions;

wherein the processor is configured to execute the executable instructions to perform the communication processing method according to claim 6.

* * * * *